(12) United States Patent
Delmonico et al.

(10) Patent No.: US 9,692,954 B2
(45) Date of Patent: Jun. 27, 2017

(54) METHODS AND DEVICES FOR ADJUSTING BRIGHTNESS OF A LIGHT SOURCE

(71) Applicant: General Electric Company, Schenectady, NY (US)

(72) Inventors: James J. Delmonico, Skaneateles, NY (US); Dennis William Mcenery, Skaneateles, NY (US)

(73) Assignee: General Electric Company, Schenectady, NY (US)

( * ) Notice: Subject to any disclaimer, the term of this patent is extended or adjusted under 35 U.S.C. 154(b) by 587 days.

(21) Appl. No.: 13/852,549

(22) Filed: Mar. 28, 2013

(65) Prior Publication Data
US 2014/0293038 A1    Oct. 2, 2014

(51) Int. Cl.
H05B 33/08    (2006.01)
H04N 5/225    (2006.01)

(52) U.S. Cl.
CPC ....... H04N 5/2256 (2013.01); H05B 33/0818 (2013.01); H05B 33/0872 (2013.01)

(58) Field of Classification Search
CPC   H05B 33/08; H05B 33/0872; H05B 33/0818; H04N 5/2256
USPC ................................. 348/82; 315/291, 302
See application file for complete search history.

(56) References Cited

U.S. PATENT DOCUMENTS

| | | | |
|---|---|---|---|
| 4,512,637 A * | 4/1985 | Ballmer | G02F 1/163 345/105 |
| 5,959,442 A | 9/1999 | Hallberg et al. | |
| 8,193,795 B2 | 6/2012 | Zhou et al. | |
| 2004/0032241 A1 | 2/2004 | Khalili | |
| 2007/0153541 A1 | 7/2007 | Bennett et al. | |
| 2009/0225158 A1* | 9/2009 | Kimoto | A61B 1/00009 348/77 |
| 2009/0225333 A1* | 9/2009 | Bendall | G01N 21/954 356/626 |
| 2010/0228089 A1* | 9/2010 | Hoffman | A61B 1/063 600/182 |

(Continued)

FOREIGN PATENT DOCUMENTS

| | | |
|---|---|---|
| EP | 2440020 A1 | 4/2012 |
| JP | H11297489 A | 10/1999 |

OTHER PUBLICATIONS

PCT Search Report and Written Opinion issued Jun. 11, 2014 in connection with corresponding PCT Patent Application No. PCT/US2014/017632.

*Primary Examiner* — Tung Vo
*Assistant Examiner* — Zaihan Jiang
(74) *Attorney, Agent, or Firm* — Barclay Damon, LLP

(57) ABSTRACT

Various exemplary devices and methods are provided for adjusting brightness of a light source. In general, the devices and methods can allow brightness of a light source to be adjusted by varying a power supply of the light source. The power supply can be varied in response to a user input. In one exemplary embodiment, the light source can be included as part of a scope, e.g., a borescope, an endoscope, etc., configured to be advanced into a target and to gather one or more video images and/or one or more still images within the target using a camera. The light source can be configured to illuminate the target at a selected one of the variable amounts of brightness. A white balance of the light source can be configured to automatically adjust in response to the selected amount of brightness.

19 Claims, 3 Drawing Sheets

(56) References Cited

U.S. PATENT DOCUMENTS

2011/0163680 A1* 7/2011 Welten ............... H05B 33/0818
　　　　　　　　　　　　　　　　　　　　　　　　　315/186
2011/0208004 A1　　8/2011　Feingold et al.

* cited by examiner

METHODS AND DEVICES FOR ADJUSTING BRIGHTNESS OF A LIGHT SOURCE

FIELD

The subject matter disclosed herein relates to methods and devices for adjusting brightness of a light source.

BACKGROUND

Borescopes are commonly used for inspection of devices such as gas and steam turbine engines to determine if there are any cracks or defects in rotating components such as turbine blades. Existing borescopes are used to investigate internal parts of the devices for cracks or overall integrity of the parts without the need to open the device's cover. Existing borescopes include video borescopes that can capture video and/or still images of the parts. Video borescopes typically include a light that illuminates the parts to facilitate visualization of the video and/or still images. Different brightnesses of the light can be required in order to clearly visualize different parts of a turbine or other device. However, some borescopes do not allow brightness of the light to be varied at all.

One typical way that brightness of the light is controlled in some borescopes is by using pulse width modulation (PWM) in which a light in the form of an LED is repeatedly turned on and off, with the "on" versus "off" time determining the amount of brightness. However, the repeated on/off cycles of the light are detectable as visual artifacts on the video. The visual artifacts negatively affect user experience and reduce clarity and color accuracy of the video image. Another typical way that brightness of the light is controlled is by using an adjustable current source to supply power to a light in the form of an LED at a specific current. The current source typically measures a voltage across a current sensing shunt and compares an amplified version of the measured voltage to a reference voltage so as to set the specific current. However, the range in which the current source can be adjusted is typically narrow due to limitations in the range of the current sensing amplifier and due to limitations in reference voltage ranges. The LED can thus only provide brightnesses within a narrow range.

Accordingly, there remains a need for improved methods and devices for adjusting brightness of a light source.

BRIEF DESCRIPTION

Methods and devices for adjusting brightness of a light source are disclosed. In one embodiment, a device is provided that includes a control circuit. The control circuit can be configured to adjust the brightness of a light source between a first brightness and a second brightness by switching between a first current gain and a second current gain that is greater than the first current gain. The light source can have a variable brightness that ranges between the first brightness and the second brightness, which can be greater than the first brightness. The first current gain can correspond to a first range of brightness of the light source that extends between the first brightness to a first intermediate brightness that is between the first and second brightnesses, and the second current gain can correspond to a second range of brightness of the light source that extends between the second brightness and a second intermediate brightness that is between the first brightness and the first intermediate brightness.

In another embodiment, a device is provided that includes a light source configured to emit light at a variably adjustable brightness, a light source brightness control element configured to receive an input from a user indicating a desired level of the brightness, and a controller configured to adjust the brightness by selecting, in response to the input, one of first and second feedback gains to control a power supply to the light source. The first gain can be less than the second gain.

In another aspect, a method is provided that includes receiving a user input regarding a device advanced into a target and illuminating with a light source one or more internal components of the target. The user input can indicate a desired level of brightness of the light source. The method can also include adjusting, in response to the user input, a power supply of the light source by changing a current of the power supply such that the brightness of the light source is adjusted. A gain controlling the power supply can be changed from a first gain to a second gain that is greater than the first gain when the current is adjusted to exceed a first predetermined threshold current, and the gain can be changed from the second gain to the first gain when the current is adjusted to be less than a second predetermined threshold current that is greater than the first predetermined threshold current.

BRIEF DESCRIPTION OF THE DRAWING

This disclosure will be more fully understood from the following detailed description taken in conjunction with the accompanying drawings, in which.

It is noted that the drawings are not necessarily to scale. The drawings are intended to depict only typical aspects of the subject matter disclosed herein and therefore should not be considered as limiting the scope of the disclosure.

DETAILED DESCRIPTION

Certain exemplary embodiments will now be described to provide an overall understanding of the principles of the structure, function, manufacture, and use of the devices and methods disclosed herein.

Various exemplary devices and methods are provided for adjusting brightness of a light source. In general, the devices, and methods can allow brightness of a light source to be adjusted by varying a power supply of the light source. The power supply can be varied in response to a user input, which can allow a user to optimally adjust brightness during use of the light source. In one exemplary embodiment, the light source can be included as part of a scope, e.g., a borescope, an endoscope, etc., configured to be advanced into a target and to gather one or more video images and/or one or more still images within the target using a camera. The light source can be configured to illuminate the target at a selected one of the variable amounts of brightness, thereby facilitating optimal illumination for gathering of the image(s). The amount of brightness can be adjusted before, during, and/or after the scope has been advanced into the target, which can allow the light source's brightness to be adjusted in real time for a specific target. A white balance of the light source can be configured to automatically adjust in response to the selected amount of brightness, thereby allowing the gathered image(s) to be consistent and color-accurate across different amounts of brightness. A dynamic range of the brightness can be relatively large. For non-limiting example, the dynamic range can be at least 275:1 (e.g., in a range from 0.004 Lumens to 1.1 Lumens), at least 600:1 (e.g., in a range from 0.1 Lumens to 60 Lumens), at least 1,000:1 (e.g., in a range from 0.001 Lumens to 1.1 Lumens), at least 10,000:1 (e.g., in a range from 0.006 Lumens to 60 Lumens), in a range between 275:1 and 10,000:1, in a range between 600:1 and 10,000:1, and up to 10,000:1, and all subranges therebetween. The relatively large dynamic range can provide for well-lit gathered image(s) and/or can allow the light source to properly illuminate a wide variety of targets having one or more different properties such as reflectivity, size, etc. that can affect quality of gathered images.

In an exemplary embodiment, the methods and devices disclosed herein can allow for brightness to be adjusted for a light source configured to respond to power control or current control. Non-limiting examples of light sources configured to respond to power control or current control include a light emitting diode (LED) (e.g., a phosphor-based LED, an organic LED, etc.) and a LASER diode.

Figure 1:
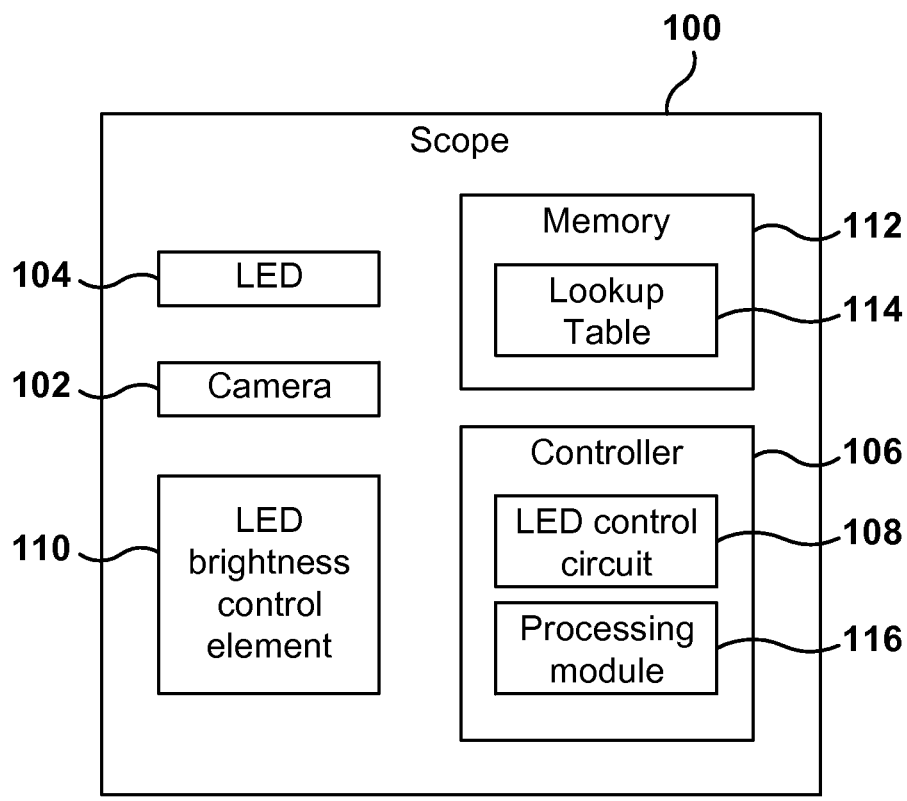
FIG. 1 is a schematic view of one embodiment of a scope.

FIG. 1 is a schematic of an exemplary embodiment of a scope 100 configured to be advanced into a target and to gather one or more video and/or still images within the target using a camera 102. The scope 100 can include a light source, which in the illustrated embodiment is in the form of an LED 104. A controller 106 of the scope 100 can be configured to control a brightness of the LED 104 using an LED control circuit 108. The controller 106 can be configured to adjust various aspects of the LED control circuit 108 in response to an external input received by a light source brightness control element, which in the illustrated embodiment is an LED brightness control element 110, as discussed further below. The scope 100 can also include a memory 112 configured to store data, such as by storing data in a lookup table 114. The controller 106 can include a processing module 116 configured to perform various processing operations, such as processing operations to operate the camera 102, to retrieve data from the memory 112, to store data in the memory 112, to cause information to be displayed on a display, etc.

The scope 100 can include one or more elements not illustrated in the embodiment of FIG. 1. For non-limiting example, the scope 100 can include any one or more of a network interface configured to facilitate communication between the scope 100 (e.g., the controller 106 thereof) with one or more external devices, an input/output (I/O) interface configured to facilitate communication with one or more I/O units (e.g., a keyboard, a touchscreen, a pointing device, a printer, a speaker, a removable memory, etc.), a display configured to show information to a user, a display controller (e.g., a video processor and a video memory) configured to generate images to be displayed on a display in accordance with instructions received from the controller 106, a proximal handle configured to facilitate handling of the scope 100 by hand, by robotic control, etc., a proximal eyepiece configured to facilitate user visualization of images gathered by the camera 102, and/or any of a variety of other components that can facilitate use of the scope 100. The term "display" as used herein refers to any of a variety of display devices, e.g., a liquid crystal display (LCD), an LED screen, a cathode ray tube (CRT) screen, a touchscreen, a 3D screen, and the like. Additionally, the term "display" as used herein can refer to a display that is fixedly mounted in the same housing or chassis as the scope 100, a display that is removably and replaceably mounted to the same housing or chassis as the scope 100, or a display that is unattached to the scope 100 such as by being a separate screen in electronic communication with the scope 100.

The scope 100 can be any scoping device configured to be advanced into a target so as to gather one or more moving and/or still images within the target using the camera 102. The scope 100 can have an on-board power source (not shown), e.g., one or more batteries, or the scope 100 can be configured to plug into or otherwise connect to an external power source. The scope 100 can have a flexible elongate shaft, the scope 100 can have a rigid elongate shaft, or combinations thereof. Having a flexible shaft can allow a scope to navigate bends, curves, tortuous body lumens, etc. In one embodiment, the scope 100 can be a borescope. By way of non-limiting example, the borescope can be configured to be advanced into a turbine so as to gather one or more images of any one or more internal components of the turbine, such as turbine blades, etc. In another embodiment, the scope 100 can be an endoscope. By way of non-limiting example, the endoscope can be configured to be advanced into a body of a patient so as to gather one or more images of any one or more internal areas of the patient's body, such as organs, vessels, body cavities, stapled tissue, etc. A person skilled in the art will appreciate that various scopes for use in various applications can be utilized with the methods and devices disclosed herein for adjusting brightness of a light source.

In another embodiment, the devices and methods disclosed herein for adjusting brightness of a light source can be included as part of an apparatus other than a scope that includes a light source. For non-limiting example, the apparatus can include a flashlight that has a light source that can have its brightness adjusted as disclosed herein. For another non-limiting example, the apparatus can include a home lighting product that includes a light source, such as a lamp.

Referring again to the embodiment of FIG. 1, the camera 102 can include one or more image gathering devices configured to gather moving images and/or still images, as will be appreciated by a person skilled in the art. The camera 102 can include a charge-coupled device (CCD) imager, a complimentary metal-oxide semiconductor (CMOS) imager, or other image gathering device configured to gather digital image data. The camera 102 can be located at a distal end of the scope 100 configured to be advanced into the target. The LED 104 can also be located at the distal end of the scope 100, or at a proximal end of the scope 100 with the LED's light being transmittable to the distal end via one or more optical fibers, which can facilitate lighting of an area being recorded, photographed, videotaped, etc. by the camera 102.

The LED 104 can include one or more semiconductor light sources configured to emit light, as will be appreciated by a person skilled in the art. In an exemplary embodiment, the LED 104 can be a white light source, although the LED 104 can emit white and/or other colors of light.

The LED brightness control element 110 can be configured to allow adjustment of an amount of brightness of the LED 104. In other words, the LED brightness control element 110 can be configured to facilitate variable brightness of the LED 104 and allow selection of a brightness of the LED 104 within a range of possible brightnesses. If the LED 104 includes a plurality of lights, the LED brightness control element 110 can be configured to simultaneously control brightness of all of the plurality of lights, or to selectively control individual lights. The LED brightness control element 110 can be configured to receive a user input thereto indicating a desired level of brightness of the LED 104. The LED brightness control element 110 can be configured to provide the user input to the controller 106, e.g., by transmitting a signal to the controller 106. The controller 106 can be configured to adjust the LED control circuit 108 based at least in part on the user input so as to adjust the brightness of the LED 104, as discussed further below.

The LED brightness control element 110 can have a variety of configurations. In one embodiment, the LED brightness control element 110 can include a movable control mechanism, e.g., a slidable lever, a rotatable knob, a depressible button, a joystick, etc., configured to be manipulated by a user, e.g., manipulated by hand, by instrument, via robotic control, etc., between a plurality of selectable positions. A position of the movable control mechanism can define the desired brightness of the LED 104. For non-limiting example, the movable control mechanism can be selectively movable between a first position corresponding to a minimum amount of brightness and a second position corresponding to a maximum amount of brightness. The movable control mechanism can be movable between predetermined discrete positions between the first and second positions, e.g., by rotating a knob between predefined positions such that the knob can "click" into each of the predefined positions, or the movable control mechanism can be movable to any position between the first and second positions, e.g., by freely rotating a knob to any selected position between the first and second positions.

The movable control mechanism can be attached to the scope 100 at a variety of locations. In one embodiment, the movable control mechanism can be located in a proximal portion of the scope 100, e.g., attached to a proximal handle thereof, which can help maintain accessibility of the movable control mechanism when a distal portion of the scope 100 has been advanced into a target. Alternatively, the movable control mechanism can be a separate element from the scope 100 and can be configured to communicate therewith via a wired or wireless connection. For non-limiting example, the movable control mechanism can include a mouse that when slid in one direction, e.g., to the right with respect to a user manipulating the mouse, increases brightness and that when slid in another, opposite direction, e.g., to the left with respect to the user manipulating the mouse, decreases brightness. For another non-limiting example, the movable control mechanism can include a virtual reality controller configured to allow hands-free brightness control. The virtual reality controller can include, e.g., motion tracking technology such as a plurality of sensors configured to communicate their relative positions to the controller 106, as will be appreciated by a person skilled in the art. The relative positions can indicate a desired level of brightness. At least one of the sensors can be coupled to a user's hand, and at least one of the sensors can be positioned at a reference location, e.g., on a handle of the scope 100. Movement of the user's hand having the sensor(s) coupled thereto can cause the sensor(s) to change position relative to the reference sensor(s), thereby indicating a brightness control. Moving the hand up can, for non-limiting example, indicate an increase in desired brightness, while moving the hand down can, for non-limiting example, indicate a decrease in desired brightness.

In another embodiment, the LED brightness control element 110 can include an electronic user interface element configured to be manipulated by a user. One embodiment of the electronic user interface element includes a touchscreen configured to be manipulated by touch via a user's finger, a user-controlled stylus, etc. The touchscreen can be configured to show a brightness control thereon, e.g., a rotatable knob, a scroll bar, a text entry box, a slidable lever, etc., that can be manipulated by touch so as to select a desired brightness.

The memory 112 can be configured to provide storage for various types of information, such as code to be executed by the controller 106, data that is processed by the controller 106, image data gathered by the camera 102, predetermined reference data stored in the lookup table 114, etc. The lookup table (LUT) 114 can include an array of indexed data and is discussed further below. The memory 112 can include any medium for storing data in a non-volatile and/or non-transient manner. The memory 112 can thus hold data and/or instructions in a persistent state, i.e., the value is retained despite interruption of power to the scope 100. The memory 112 can include read only memory (ROM), flash memory, one or more varieties of random access memory (RAM), and/or a combination of memory technologies. Non-limiting examples of the memory 112 include one or more hard disk drives, flash drives, universal serial bus (USB) drives, optical drives, various media disks or cards, and/or any combination thereof, and can be directly connected to the other components of the scope 100 or remotely connected thereto, such as over a network. The memory 112 can be included within the housing or chassis of the scope 100, or the memory 112 can be an external component in electronic wired or wireless communication with the scope 100.

The controller 106 can be configured to control operation of the scope 100, for non-limiting example by executing an operating system (OS), a basic input/output system (BIOS), device drivers, application programs, and so forth. The controller 106 can include any type of microprocessor, microcontroller, or central processing unit (CPU), including programmable general-purpose or special-purpose microprocessors and/or any one of a variety of proprietary or commercially-available single or multi-processor systems. The controller 106 can be included within a housing or chassis of the scope 100, or the controller 106 can be an external component in electronic wired or wireless communication with the scope 100, such as over a network.

The processing module 116 can include one or more software modules configured to be executed by the controller 116 to facilitate user interaction with the scope 100. The software module(s) can be part of a single program or one or more separate programs, and can be implemented in a variety of contexts, e.g., as part of an operating system, a device driver, a standalone application, and/or combinations thereof. A person skilled in the art will appreciate that any software functions being performed by a particular software module can also be performed by any other module or combination of modules.

The processing module 116 can be configured to control the LED control circuit 108, also referred to herein as a "control circuit." The control circuit 108 is shown in the illustrated embodiment as being included within the housing or chassis of the scope 100 as part of the controller 106, but the control circuit 108 can be an external component from the scope 100, such as by being included in a base unit that includes the controller 106. Additionally, although the control circuit 108 is shown as part of the controller 106 in the illustrated embodiment, the control circuit 108 can be a separate component from the controller 106 and can be configured to be in electronic communication with the separate controller 106, as will be appreciated by a person skilled in the art.

The control circuit 108 can be configured to adjust the variable brightness of the LED 104 using a plurality of circuit components. In general, the control circuit 108 can be configured to provide a multi-range power supply to the LED 104. A number of the ranges can be any whole number two or greater, e.g., two, three, four, five, six, seven, etc. In an exemplary embodiment, the number can be two such that the control circuit 108 can provide a dual-range power supply, e.g., a high range and a low range. In another exemplary embodiment, the number can be three such that the control circuit 108 can provide a triple-range power supply, e.g., a high range, a low range, and an intermediate range.

The control circuit 108 can be configured to be switchable between the different ranges. The selected range can correspond to particular gain of the control circuit 108 such that the control circuit 108 can include a plurality of predefined gains, e.g., a plurality equal to the number of ranges. As discussed further below, the user input to the LED brightness control element 110 can be transmitted as a signal to the controller 106, which, in response to the signal, can be configured to cause adjustment of the control circuit 108. The adjustment of the control circuit 108 can vary the amount of power supplied to the LED 104, thereby varying the brightness of the LED 104 in accordance with the user input. The controller 106 can be configured to cause the control circuit 108 to switch between the predefined ranges. Generally, the controller 106 can be configured to adjust the brightness of the LED 104 by selecting, in response to the user input, one of a plurality of predefined feedback gains in the control circuit 108 to supply power to the LED 104.

The control circuit 108 can have a variety of configurations. In general, the control circuit 108 can be configured to have variable feedback gain and to have a fixed current sense resistor. The variable gain can be provided by the control circuit 108 via an amplifier with switchable gain, e.g., with the amplifier having discrete or continuous gain adjustment. Alternatively, the variable gain can be provided by the control circuit 108 via a switchable current sensing element, e.g., a current sensing element with adjustable sensitivity. Non-limiting examples of such a current sensing element include a plurality of series connected resistors that can be individually bypassed, a plurality of parallel connected resistors that can be selectively connected or disconnected, and a hall effect sensor or other sensor.

Figure 2:
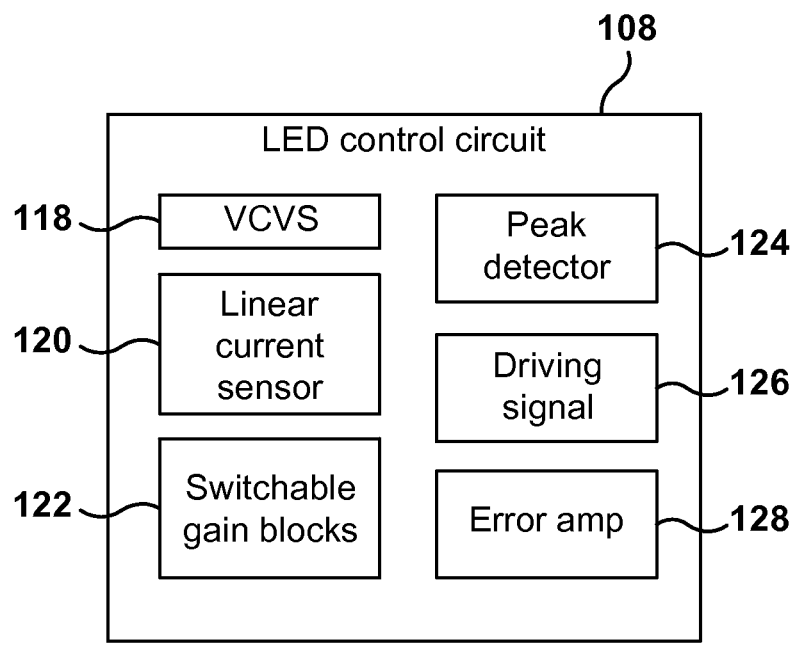
FIG. 2 is a schematic view of one embodiment of a control circuit of the scope of FIG. 1.

In an exemplary embodiment, the control circuit 108 can include a current regulated switch mode power supply with a switchable range such that the control circuit 108 can be switched between the different predetermined ranges. In one embodiment shown in FIG. 2, the control circuit 108 can include a current regulated switch mode power supply with a switchable range and can include a voltage-controlled voltage-source (VCVS) 118, a linear current sensor 120, switchable gain blocks 122, a peak detector 124, a driving signal 126, and an error amplifier 128, which is also referred to herein as an "error amp." Each of the VCVS 118, the linear current sensor 120, the switchable gain blocks 122, the peak detector 124, the driving signal 126, and the error amp 128 can have a variety of configurations.

Figure 3:
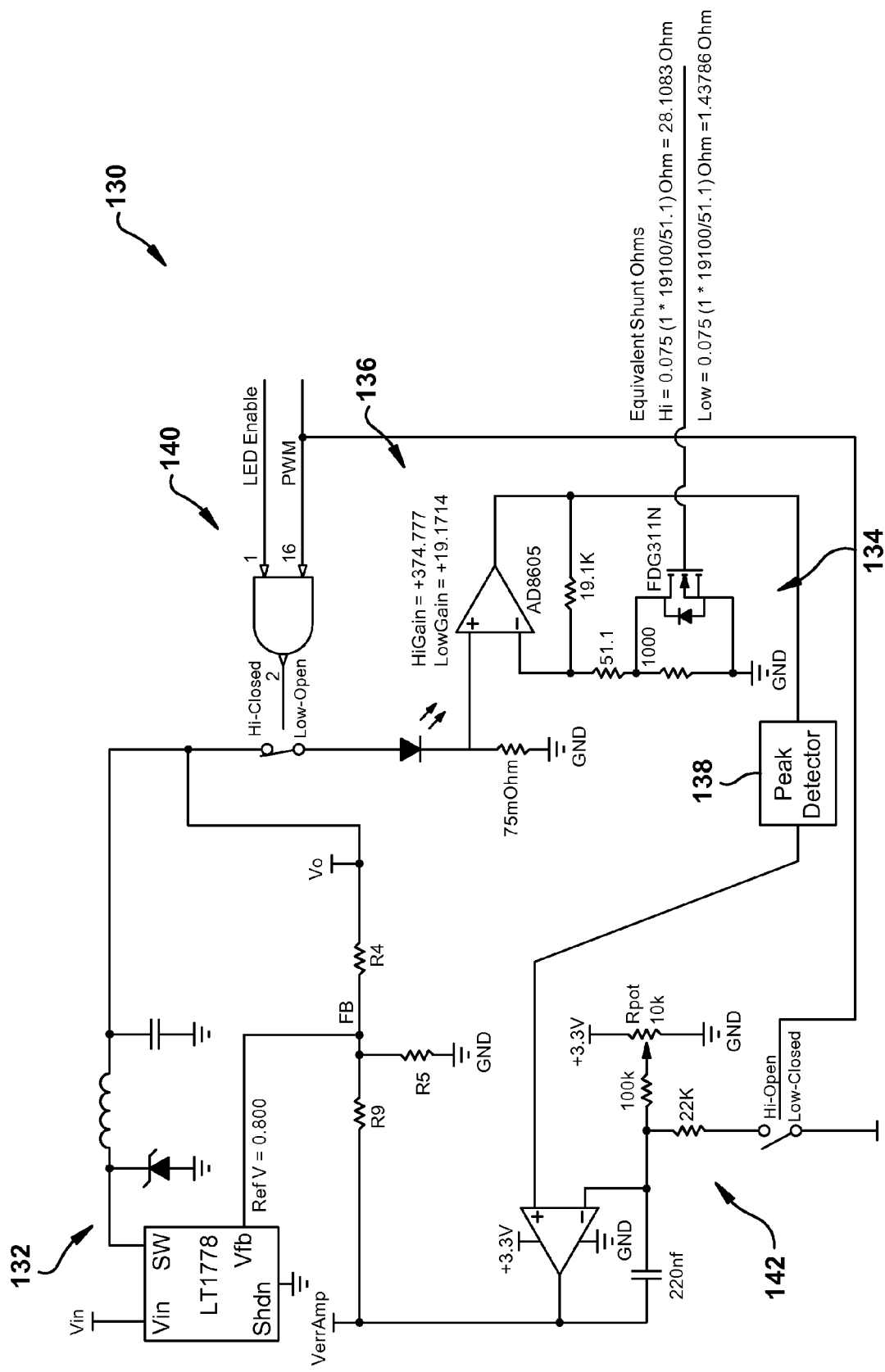
FIG. 3 is a schematic diagram of one embodiment of the control circuit of FIG. 2.

FIG. 3 illustrates one embodiment of a control circuit 130 that includes a VCVS 132, a linear current sensor 134, switchable gain blocks 136, a peak detector 138, a driving signal 140, and an error amplifier 142. The values of various electrical components, e.g., resistors, capacitors, etc., shown in the illustrated schematic of the control circuit 130 are exemplary values. Any one or more of the electrical components can have different values in other embodiments. Similarly, the specific chips identified in the illustrated embodiment, e.g., LT1778 available from Linear Technology, Inc. of Milpitas, Calif., AD8605 available from Analog Devices, Inc. of Norwood, Mass., and FDG311N available from Fairchild Semiconductor Corporation of San Jose, Calif., are illustrative examples, and any one or more can be different chips in other embodiments. In the illustrated embodiment, the control circuit 130 provides for first and second ranges, e.g., low and high ranges. By way of non-limiting example, the low range can provide for a regulated current in a range of 3 to 100 mA, and the high range can provide for a regulated current in a range of 100 to 1800 mA. The control circuit 130 can thus provide for a dynamic range of 600:1 (e.g., 1800 mA:3 mA).

The control circuit 130 is fully compatible with pulse width modulation (PWM) requirements and shuttering requirements which can save power when the PWM is in an "off" state, e.g., when the camera 102, e.g., a CCD video imager, is not gathering light. The LED 104 can be "off" when the camera 102 is not gathering light, which can also save power. Because a light source can represent up to about 30% of a power drain in a scope, saving power can allow a battery-powered scope to be used for a longer period of time without running out of battery power. The LED 104 can thus appear to be under PWM control to a user but not to the camera 102. The control circuit's voltage converter can be idle when the PWM is in the "off" state so as to consume minimal power. When the camera 102 is gathering light, the LED 104 can be "on" with no PWM and with the control circuit 106 controlling power supply to the LED 104. The on/off times of the PWM can be less than, e.g., 2 μs. The peak detector 138 can allow for regulation of peak current, with a duty cycle of the PWM not affecting the regulated current level. The peak detector 138 can be configured to detect peaks of relatively small signals, e.g., up to about 10 mV, such as used by the control circuit 108 to power the LED 104.

The control circuit 130 can be varied and still be configured to provide a variable power supply to an LED so as to control brightness of the LED. The control circuit 130 in the illustrated embodiment is configured to regulate peak current. A control circuit can, however, in another embodiment be configured to regulate average current instead of peak current. Such a configuration would not allow a shutter function if peak illumination was desired, e.g., not allow control of an amount of exposure time. To be configured to regulate average current, the control circuit's sample and hold circuit can be eliminated. Instead of using the sample and hold circuit to sample voltage and hold the voltage at a constant level for a predetermined amount of time, the control circuit can be configured to capture an optical signal at the LED using a transimpedance amplifier. The captured signal can be used to control the control circuit's feedback loop. The control circuit can thus be configured to provide a tighter control of the LED's brightness, e.g., of output illumination or Lumens.

The linear current sensor 134 can, in another embodiment, be replaced with a "calibrated" and temperature compensated silicon diode device, e.g., a logarithmic sensor. The seven-bit linear pot signal can be compared with the Log (current) and extend its range of the feedback system.

In some embodiments, the resistor (100K) and capacitor (220 nF) of the error amp 142 can be resealed so as to reduce turn on time. Reducing turn on time can lead to system instability, but this instability can be prevented or compensated for by replacing the seven-bit potentiometer (pot) of the control circuit 130 with a digital-to-analog converter (DAC) such as a twelve-bit DAC. This replacement can allow smaller signals to be generated repeatedly at faster turn on times.

Also regarding turn on times, the switchable gain blocks 122 can allow the scope 100 to turn on with a relatively fast rise time even at a very low light level. The switchable gain blocks 122 can provide a relatively large signal at very low levels of current, thereby facilitating a relatively fast turn on time.

The VCVS 132 in the illustrated embodiment includes a switch mode buck regulator, but a switch mode topology other than the switch mode buck regulator can be used. Non-limiting examples of other switch mode topologies include boost topology, boost/buck topology, sepic topology, flyback topology, etc. Instead of using an inductive switch-mode regulator as in the illustrated embodiment, the control circuit 130 can use switched capacitive regulation. The regulator element can, for non-limiting example, be a linear regulator.

Referring again to FIGS. 1 and 2, the control circuit 108 can have a plurality of predefined current gains in the power supply circuit thereof that supplies power to the LED 104. Each of the current gains can correspond to a range of brightness of the LED 104. The controller 106 can be configured to adjust the control circuit's digital pot based on a signal from the LED brightness control element 110 indicating a user input thereto, e.g., requesting an increase or decrease in LED brightness. In response to the user input, the controller 106 can be configured to cause a logarithmic increase or decrease in the regulated current within the present gain range, depending on whether the user is requesting an increase or decrease in LED brightness, by selecting the proper range based on current level and adjusting the current in the control circuit 108, e.g., by adjusting the digital pot or the DAC of the control circuit 108. The logarithmic change can generally approximate the human eye and/or a camera sensor's response to light. The controller 106, e.g., the processing module 116 thereof, can be configured to select the proper range by comparing the current in the control circuit 106 to predefined upper and lower limits of each of the ranges. The predefined upper and lower limits of each of the ranges can be stored in the memory 112. The controller 106, e.g., the processing module 116 thereof, can be configured to adjust the current in the control circuit 106 by transmitting a control signal thereto. The control signal can be generated via a mathematical equation stored in the memory 112 or via the lookup table 114 that can associate different inputs from the LED brightness control element 110 with different currents. For non-limiting example, each position of a movable control mechanism can be associated with a specific, predetermined current. For another non-limiting example, each input to an electronic user interface element, e.g., each position of an electronic scroll bar, can be associated with a specific, predetermined current. The currents can increase and decrease logarithmically.

The controller 106 can thus be configured to selectively switch gains of the control circuit 108 during use of the LED 104. The brightness of the LED 104 can therefore be adjusted in real time.

As mentioned above, each of the gain ranges can have a predefined lower limit and a predefined upper limit, e.g., predefined upper and lower current values. The predefined upper and lower limits of the ranges can serve as threshold values that the controller 106 can be configured to use as triggers for various events. When the current moves above the predefined upper limit of the lower range, the controller 106 can be configured to cause the control circuit 108 to switch from the lower range to the upper range. Similarly, when the current moves below the predefined lower limit of the upper range, the controller 106 can be configured to cause the control circuit 108 to switch from the upper range to the lower range. The predefined upper limit of the lower range can be greater than the predefined lower limit of the upper range. In other words, the upper and lower ranges can partially overlap. Providing partially overlapping current ranges can help provide a seamless transition between the lower and upper ranges imperceptible to a user. If a control circuit has more than two ranges, each of the ranges can overlap with each of its adjacent one or two of the ranges so as to allow seamless transition between adjacent ones of the ranges.

Figure 4:
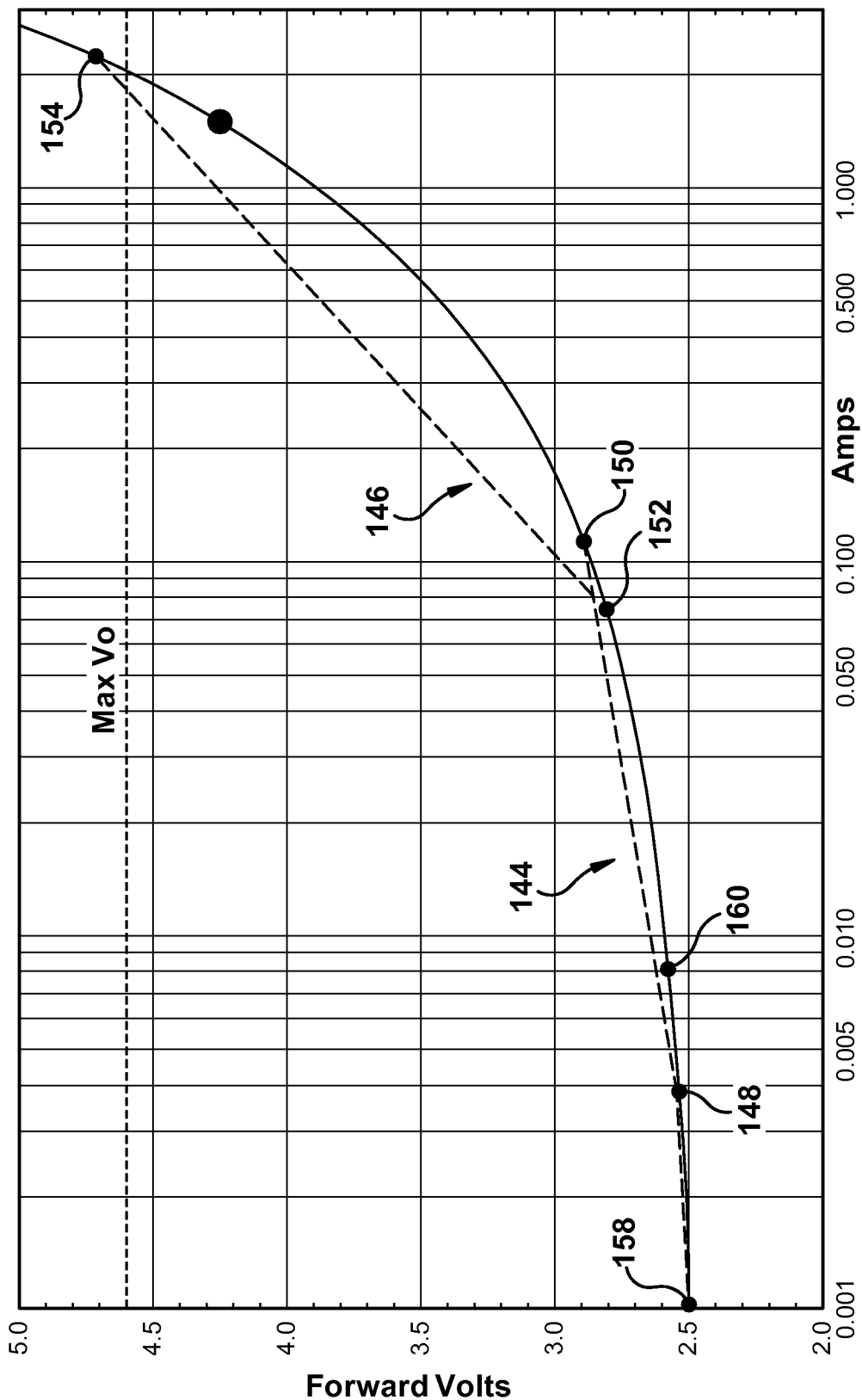
FIG. 4 is a graph showing voltage versus current performance data for the control circuit of FIG. 3.

FIG. 4 illustrates an embodiment of current/illumination performance for the control circuit 130 of FIG. 3 that has a first range 144 and a second range 146 that partially overlap with one another. The first range 144 in the illustrated embodiment has a predefined lower limit 148 of about 0.0038 A and a predefined upper limit 150 of about 0.12 A. The second range 146 in the illustrated embodiment has a predefined lower limit 152 of about 0.075 A and a predefined upper limit 154 of about 1.12 A. The predefined upper limit 150 of the first range 144 can be, as shown in the illustrated embodiment, greater than the lower limit 152 of the second range 146, such that the first and second ranges 144, 146 overlap. As shown in FIG. 4, and as mentioned above, the currents can increase and decrease logarithmically.

FIG. 4 also shows a maximum output voltage Vo, shown in FIG. 3, of the control circuit's buck regulator included in the VCVS 118. The value of Vo in the illustrated embodiment is about 4.6V, but the value of Vo can be different based on values for resistors R4, R5, and R9. A minimum output voltage Vo also exists, but its value of about 1.0V in the illustrated embodiment is off the scale of the Y axis as shown. Adjusting a range of the output voltage Vo, e.g., by adjusting values of any one or more of the resistors R4, R5, and R9, can maximize steps of the control circuit's digital pot.

FIG. 4 also shows a non-limiting example of a third range 156. The third range 156 extends below the first range 144 in the illustrated embodiment, but a third range can extend above the second range 146. Similarly, any number of ranges can be below the first range 144, and any number of ranges can be above the second range 146. In the illustrated embodiment, the third range 156 has a predefined lower limit 158 of about 0.001 A and a predefined upper limit 160 of about 0.008 A. The predefined upper limit 160 of the third range 156 can be, as shown in the illustrated embodiment, greater than the lower limit 148 of the first range 144, such that the first and third ranges 144, 156 overlap.

Referring again to FIGS. 1 and 2, the controller 106 can be configured to automatically adjust white balance of the LED 104. As will be appreciated by a person skilled in the art, a color temperature of a white LED can change when the white LED is dimmed by reducing direct current (DC) power thereto, e.g., when brightness of the white LED is reduced. The controller 106 can thus be configured to automatically compensate for this change in color temperature so as to help prevent a shift in user-perceived colors in image(s) gathered by the camera 102.

The controller 106 can be configured to adjust white balance in a variety of ways. In an exemplary embodiment, the controller 106 can be configured to adjust white balance of the LED 104 based at least in part on user input to the LED brightness control element 110. The controller 106 can thus be configured to automatically adjust brightness of the LED 104 and white balance of the LED 104 in real time in response to user input. The controller 106 can be configured to adjust the white balance of the LED based on a characterization of the color temperature variation versus LED DC input power and LED physical temperature, thereby compensating for color temperature variation when the LED's brightness changes. More particularly, the controller 106 can be configured to receive at least one signal indicating the LED's physical temperature and the power supply control of the control circuit 108, e.g., the current being supplied by the control circuit 108. The controller 106, e.g., the processing module 116 thereof, can be configured to determine the appropriate color temperature based on the LED's physical temperature and the power supply control of the control circuit 108 using data stored in the LUT 114 or by performing a mathematical calculation relating the LED DC drive level and a characterized LED color temperature versus DC drive level. The physical temperature of the LED 104 can be gathered in a variety of ways, as will be appreciated by a person skilled in the art, such as by using a temperature sensor attached to the scope 100 and configured to sense the physical temperature of the LED 104 and transmit the sensed temperature to the controller 106. The data stored in the LUT 114 regarding color temperature can include predetermined associations of different power supply settings with different color temperatures. The resulting color temperature determined via mathematical algorithm or via the LUT 114 can be used to adjust processing performed on image data received from the camera 102 to correct for any shift in color temperature of the LED 104, thereby allowing gathered images to be consistent and color accurate.

In use, as mentioned above, the devices discussed herein can be used in gathering images of a target, e.g., of one or more internal components of an apparatus or patient. Although an exemplary use is discussed below with respect to the scope 100 of FIG. 1, any of the devices disclosed herein can be similarly used.

A distal portion of the scope 100 including the camera 102 and the LED 104 can be advanced into a target, e.g., a turbine, a patient, etc. The distal portion of the scope 100 can be adjusted in position relative to the target so as to allow the camera 102 to view and gather images of one or more internal components of the target. If the LED 104 is not providing adequate light for any reason, e.g., the LED 104 is not bright enough and the one or more internal components appear too dark, the LED 104 is too bright and the one or more internal components appear to be overexposed, the LED 104 is bright enough to be causing undesirable reflections, the one or more internal components can be damaged or otherwise disrupted if exposed to too much light, etc., a user can actuate the LED brightness control element 110 to adjust the brightness of the LED 104. The LED brightness control element 110 can be actuated in any number of ways, as discussed above, such as by sliding a lever, rotating a knob, or manipulating a virtual control shown on a touchscreen.

In response to the user input, the LED brightness control element 110 can transmit a signal to the controller 106 indicating the user input. The signal from the LED brightness control element 110 to the controller 106 can include any number of separate signals. In response to the signal indicating the user input, the controller 106 can be configured to modify the current of the control circuit 106 that supplied power to the LED 104, thereby adjusting the brightness of the LED 104 in response to the user input. As discussed above, if the user input causes the current of the control circuit 106 to move from one predefined range to another predefined range, the controller 106 can cause the gain of the control circuit 106 to change from the one predefined range to the other predefined range. The controller 106 can also be configured to adjust the white balance of the LED 104, as discussed above, in response to the signal from the LED brightness control element 110. The user can repeatedly actuate the LED brightness control element 110 any number of times during use of the scope 100, with the controller 106 adjusting the LED's brightness in response to each user input. The brightness of the LED 104 and the color temperature can thus be repeatedly adjusted in real time.

The image(s) gathered by the camera 102 can be displayed in real time on a display and/or can be stored in the memory 112 for later viewing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A device, comprising:
 a light source comprising a variable brightness that ranges between a first brightness and a second brightness, the second brightness being greater than the first brightness;
 a camera, the camera and the light source being configured to be advanced into a target, the light source being configured to illuminate one or more internal components of the target, and the camera being configured to gather one or more images of the illuminated one or more internal components; and
 a control circuit configured to adjust the brightness of the light source without using on/off cycling of the light source, the control circuit comprising:
   at least one switchable gain block coupled to the light source, the at least one switchable gain block being selectively switchable between a first current gain and a second current gain, the first and second current gains being different current gains, wherein the control circuit is adapted for switching the switchable gain block to the first current gain responsive to a light source brightness control element changing the brightness of the light source in a first range of brightness of the light source that extends between the first brightness to a first intermediate brightness that is between the first and second brightnesses, and to the second current gain responsive to the light source brightness control element changing the brightness of the light source in a second range of brightness of the light source that extends between a second intermediate brightness and the second brightness, the second intermediate brightness being less than the first intermediate brightness;
   wherein the first and second ranges have an overlap range of brightness, the overlap range of brightness extending from the second intermediate brightness to the first intermediate brightness and facilitating a transition of the brightness of the light source between the first range and the second range; and wherein the control circuit is adapted for controlling the switchable gain block using in part a predetermined illumination performance function, the controlling comprising:
receiving first input signals from the light source and second input signals from the brightness control element;
determining, from the first and second input signals and the predetermined illumination performance function, a brightness transition between a first range of brightness of the light source and a second range of brightness of the light source;
switching the switchable gain block from the first current gain to the second current gain responsive to the brightness transition being from less than the overlap range of brightness into the overlap range of brightness; and
switching the switchable gain block from the second current gain to the first current gain responsive to the brightness transition being from greater than the overlap range of brightness into the overlap range of brightness; and
a processing module, the processing module being adapted for correcting the gathered one or more images of the illuminated one or more internal components for a shift in a color temperature of the light source due to the adjustment of the brightness without using on/off cycling of the light source.

2. The device of claim 1, wherein the switching is configured to occur in response to an input from a user indicating a desired level of the brightness.

3. The device of claim 2, further comprising a controller configured to receive the input and to cause the control circuit to switch between the first and second current gains in response to the input.

4. The device of claim 1, wherein the control circuit includes at least one of a potentiometer and an adjustable voltage reference digital-to-analog converter (DAC); and
wherein the at least one of the potentiometer and the adjustable voltage reference DAC are configured to be adjusted to cause the switch between the first and second current gains.

5. The device of claim 1, wherein the control circuit is configured to switch between the first current gain and the second current gain when a current of the control circuit passes a predetermined threshold current.

6. The device of claim 5, wherein when the current gain is at the first current gain, the predetermined threshold current is a first current corresponding to the second intermediate brightness such that control circuit is configured to switch from the first current gain to the second current gain when the current of the control circuit moves above the first current; and
when the current gain is at the second current gain, the predetermined threshold current is a second current corresponding to the first intermediate brightness such that control circuit is configured to switch from the second current gain to the first current gain when the current of the control circuit moves below the second current.

7. The device of claim 1, wherein the light source has a white balance that is adjustable based at least on the color temperature of the light source and the brightness of the light source.

8. The device of claim 1, wherein the control circuit is configured to switch between the first current gain, the second current gain, and a third current gain, the third current gain corresponding to a third range of brightness of the light source that extends between a third brightness that is less than the first brightness and a third intermediate brightness that is between the third intermediate brightness and the first intermediate brightness.

9. The device of claim 8, wherein the third intermediate brightness is greater than the first brightness.

10. The device of claim 8, wherein: when the current gain is at the first current gain, the control circuit is configured to switch from the first current gain to the second current gain when the brightness moves above the second intermediate brightness in response to a user input;
when the current gain is at the first current gain, the control circuit is configured to switch from the first current gain to the third current gain when the brightness moves below the third intermediate brightness in response to a user input;
when the current gain is at the second current gain, the control circuit is configured to switch from the second current gain to the first current gain when the brightness moves below the first intermediate brightness in response to a user input; and
when the current gain is at the third current gain, the control circuit is configured to switch from the third current gain to the first current gain when the brightness moves above the first brightness in response to a user input.

11. A device, comprising:
a light source configured to emit light at a variably adjustable brightness that ranges between a first brightness and a second brightness without using on/off cycling of the light source, wherein the second brightness is greater than the first brightness;
a camera, the camera and the light source being configured to be advanced into a target, the light source being configured to illuminate one or more internal components of the target, and the camera being configured to gather one or more images of the illuminated one or more internal components;
a light source brightness control element configured to receive an input from a user indicating a desired level of the brightness;
a control circuit configured to adjust the brightness of the light source, the control circuit comprising:
at least one switchable gain block coupled to the light source, the at least one switchable gain block being selectively switchable between a first current gain and a second current gain, the first and second current gains being different current gains, wherein the control circuit is adapted for switching the switchable gain block to the first current gain responsive to the light source brightness control element changing the brightness of the light source in a first range of brightness of the light source that extends between the first brightness to a first intermediate brightness that is between the first and second brightnesses, and to the second current gain responsive to the light source brightness control element changing the brightness of the light source in second range of brightness of the light source that extends between a second intermediate brightness and the second brightness and a second intermediate brightness, the second intermediate brightness being less than the first intermediate brightness, wherein the first and second ranges have an overlap range of brightness, the overlap range of brightness extending from the second intermediate brightness to the first intermediate brightness and facilitating a transition of the brightness of the light source between the first range and the second range; and a controller configured to:
adjust the brightness by controlling the switchable gain block using in part a predetermined illumination performance function, the controlling comprising:
receiving first input signals from the light source and second input signals from the brightness control element;
determining, from the first and second input signals and the predetermined illumination performance function, a brightness transition between a first range of brightness of the light source and a second range of brightness of the light source;
switching the switchable gain block from the first current gain to the second current gain responsive to the brightness transition being from less than the overlap range of brightness into the overlap range of brightness;
switching the switchable gain block from the second current gain to the first current gain responsive to the brightness transition being from greater than the overlap range of brightness into the overlap range of brightness; and
correcting the gathered one or more images of the illuminated one or more internal components for a shift in a color temperature of the light source due to the adjustment of the brightness without using on/off cycling of the light source.

12. The device of claim 11, wherein the controller is configured to adjust the brightness when the light source is emitting light such that the user can visually perceive the brightness adjustment.

13. The device of claim 11, wherein a dynamic range of the brightness is at least 600:1.

14. The device of claim 11, wherein the controller is configured to adjust the brightness by selecting, in response to the input, one of the first feedback gain, the second feedback gain, and at least one additional feedback gain to supply power to the light source.

15. The device of claim 14, wherein a dynamic range of the brightness is at least 10000:1.

16. The device of claim 11, wherein the light source is configured to be advanced into any one of a turbine, so as to illuminate one or more internal parts of the turbine at the brightness, and a body of a patient, so as to illuminate one or more internal areas of the patient at the brightness.

17. A method comprising:
adjusting the brightness of a light source without using on/off cycling of the light source, the light source having a variable brightness that ranges between a first brightness and a second brightness, the second brightness being greater than the first brightness, the adjusting the brightness of the light source comprising:
receiving a user input regarding a device advanced into a target and illuminating with a light source one or more internal components of the target, the user input indicating a desired level of brightness of the light source; and
adjusting, in response to the user input, a power supply of the light source by changing a current of the power supply such that the brightness of the light source is adjusted, the adjusting the power supply comprising:
switching a switchable gain block coupled to the light source from a first current gain to a second current gain that is greater than the first current gain when the current is adjusted to exceed a first predetermined threshold current, and from the second current gain to the first current gain when the current is adjusted to be less than a second predetermined threshold current that is greater than the first predetermined threshold current, wherein switching to the first current gain is responsive to a light source brightness control element changing the brightness of the light source in a first range of brightness of the light source that extends between the first brightness to a first intermediate brightness that is between the first and second brightnesses, and switching to the second current gain is responsive to the light source brightness control element changing the brightness of the light source in a second range of brightness of the light source that extends between a second intermediate brightness and the second brightness and a second intermediate brightness, the second intermediate brightness being less than the first intermediate brightness;
wherein the first and second ranges have an overlap range of brightness, the overlap range of brightness extending from the second intermediate brightness to the first intermediate brightness and facilitating a transition of the brightness of the light source between the first range and the second range; and
controlling the switchable gain block using in part a predetermined illumination performance function, the controlling comprising:
receiving first input signals from the light source and second input signals from the brightness control element;
determining, from the first and second input signals and the a predetermined illumination performance function, a brightness transition between a first range of brightness of the light source and a second range of brightness of the light source;
switching the switchable gain block from the first current gain to the second current gain responsive to the brightness transition being from less than the overlap range of brightness into the overlap range of brightness; and
switching the switchable gain block from the second current gain to the first current gain responsive to the brightness transition being from greater than the overlap range of brightness into the overlap range of brightness;
advancing the light source and a camera into a target, the light source being configured to illuminate one or more internal components of the target, and the camera being configured to gather one or more images of the illuminated one or more internal components; and
correcting the gathered one or more images of the illuminated one or more internal components for a shift in a color temperature of the light source due to the adjustment of the brightness without using on/off cycling of the light source.

18. The method of claim 17, further comprising, when the current is adjusted to be less than a third predetermined threshold that is less than the first predetermined threshold current, changing from the first current gain to a third current gain that is less than the first current gain.

19. The method of claim 17, further comprising adjusting, in response to the user input, a white balance of the light source based at least on the current of the power supply and the color temperature of the light source.

* * * * *